United States Patent
Nagai et al.

(10) Patent No.: US 6,376,641 B2
(45) Date of Patent: *Apr. 23, 2002

(54) AROMATIC-ALIPHATIC COPOLYCARBONATE AND PROCESS FOR PRODUCING THE SAME

(75) Inventors: Satoshi Nagai; Osamu Kondo; Kyohei Takakuwa; Yoshinori Isahaya; Takayasu Fujimori, all of Ibaraki (JP)

(73) Assignee: Mitsubishi Gas Chemical Company, Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/328,487

(22) Filed: Jun. 9, 1999

(30) Foreign Application Priority Data

Jun. 10, 1998 (JP) .......................... 10-162176
Jun. 12, 1998 (JP) .......................... 10-165203

(51) Int. Cl.$^7$ .................. C08G 64/16; C08G 64/30
(52) U.S. Cl. ................ 528/198; 528/201; 528/99; 525/462
(58) Field of Search ................. 528/201, 204, 528/198, 97, 99, 100, 104; 525/462, 469, 470

(56) References Cited

U.S. PATENT DOCUMENTS

| | | | | |
|---|---|---|---|---|
| 4,316,980 A | * | 2/1982 | Idel et al. ................. | 528/199 |
| 4,327,015 A | * | 4/1982 | Druschke et al. ......... | 524/162 |
| 4,910,283 A | * | 3/1990 | Kawaki et al. ............ | 528/201 |
| 5,021,542 A | * | 6/1991 | Serini et al. ............... | 528/204 |
| 5,187,242 A | * | 2/1993 | Sakashita et al. .......... | 525/439 |
| 5,342,819 A | * | 8/1994 | Takiguchi et al. ......... | 503/227 |
| 5,405,934 A | * | 4/1995 | Oshino et al. .............. | 528/204 |
| 5,910,562 A | * | 6/1999 | Miura et al. ................ | 528/201 |

FOREIGN PATENT DOCUMENTS

JP          1223121          * 9/1989

OTHER PUBLICATIONS

English Translation of JP 1223121, 1989.*

* cited by examiner

*Primary Examiner*—Vasu Jagannathan
*Assistant Examiner*—Callie E. Shosho
(74) *Attorney, Agent, or Firm*—Sughrue Mion, PLLC

(57) ABSTRACT

An aromatic-aliphatic copolycarbonate and a process for producing the same which comprises polycondensation of an aromatic dihydroxy compound, such as 1,1-bis(4-hydroxyphenyl)cyclohexane, tricyclo$(5.2.1.0^{2,6})$ decanedimethanol, and a carbonic acid diester in a molten state under heating, wherein the carbonic acid diester has a chlorine content of 20 ppm or lower. The copolycarbonate has improved refractive index, balance of dispersion, and photoelastic constant while retaining high impact resistance, high heat resistance, and excellent hue.

6 Claims, No Drawings

AROMATIC-ALIPHATIC COPOLYCARBONATE AND PROCESS FOR PRODUCING THE SAME

FIELD OF THE INVENTION

This invention relates to an aromatic-aliphatic copolycarbonate having a low photoelastic constant, a high refractive index, and a high inverse dispersion value and exhibiting excellent hue, impact resistance, and heat resistance, and to a process for producing the same.

BACKGROUND OF THE INVENTION

Polycarbonate obtained by interfacial polymerization of an aromatic dihydroxy compound, such as 2,2-bis(4-hydroxyphenyl) propane (bisphenol A, hereinafter abbreviated as BPA), and phosgene in the presence of an acid binder is excellent in heat resistance and transparency as well as mechanical characteristics such as impact resistance and has been used as an optical material in various lenses, prisms, optical disc substrates, and the like.

Polycarbonate comprising BPA alone as an aromatic dihydroxy compound (hereinafter referred to as BPA-polycarbonate), however, has a large photoelastic constant and relatively poor melt flow characteristics only to provide molded articles with large birefringence. Further, it has as high a refractive index as 1.58 but an Abbe's number of no more than 30 so that the performance is insufficient for wide applications to optical recording materials, optical lenses, etc.

To overcome these disadvantages of the BPA-polycarbonate, a copolycarbonate prepared from BPA and tricyclo(5.2.1.0$^{2,6}$)decanedimethanol (hereinafter abbreviated as TCDDM) has been proposed (see JP-A-64-66234). However, the copolycarbonate resin having TCDDM as a copolymer component has a disadvantage of having a low glass transition temperature and being inferior in heat resistance to the BPA-polycarbonate.

The only method disclosed for preparing the BPA-TCDDM copolycarbonate consists of polycondensation between BPA bischloroformate and TCDDM or a combination of TCDDM and BPA, polycondensation between TCDDM bischloroformate and BPA or a combination of BPA and TCDDM, or polycondensation between a mixture of BPA bischloroformate and TCDDM bischloroformate and BPA and/or TCDDM. The method for preparing a copolymer comprising an aliphatic dihydroxy compound and an aromatic dihydroxy compound involves two stages of first preparing a bischloroformate of a dihydroxy compound and then polycondensing the bischloroformate with a dihydroxy compound. The production process is complicated, and the production cost increases as a result.

SUMMARY OF THE INVENTION

An object of the present invention is to provide an economical process for producing an aromatic-aliphatic copolycarbonate resin having a high Abbe's number and a low photoelastic constant while retaining high impact resistance, an excellent hue, and high heat resistance.

As a result of extensive investigation on an aromatic-aliphatic copolycarbonate with excellent performance and a process for producing the same, the inventors have found that the object is accomplished by reducing the chlorine content of a carbonic acid diester used as a starting material.

That is, it has been found that an aromatic-aliphatic copolycarbonate resin obtained by polycondensation of an aliphatic dihydroxy compound, TCDDM, and a carbonic acid diester having a specific chlorine content in a molten state under heating exhibits well-balanced physical properties, having excellent impact resistance, high heat resistance, a high Abbe's number, and a low photoelastic constant.

The invention provides an aromatic-aliphatic copolycarbonate comprising a repeating unit represented by formula (I):

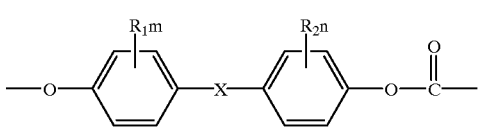

wherein X represents

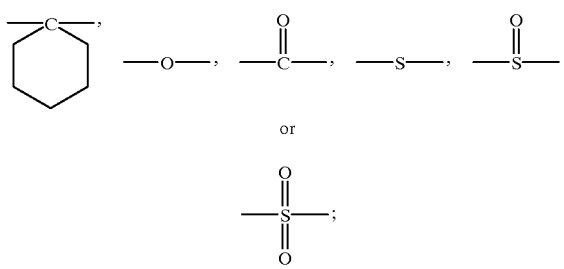

$R_1$ and $R_2$, which may be the same or different, each represent a hydrogen atom, an alkyl group having 1 to 10 carbon atoms or a halogen atom; and m and n, which represent the number of substituent $R_1$ or $R_2$, respectively, are each an integer of 0 to 4, and a repeating unit represented by formula (II):

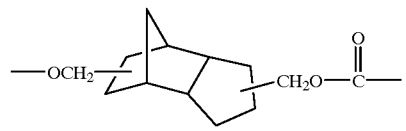

The invention also provides a process for producing the above-described aromatic-aliphatic copolycarbonate comprising polycondensing at least one aromatic dihydroxy compound represented by formula (III):

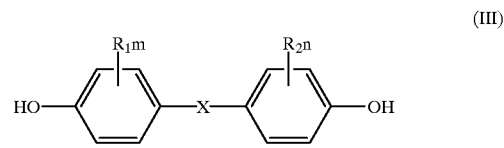

wherein X, $R_1$, $R_2$, m, and n are the same as defined above, tricyclo(5.2.1.0$^{2,6}$)decanedimethanol represented by formula (IV):

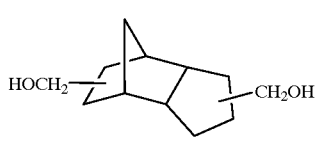

and a carbonic acid diester in a molten state under heating, wherein the carbonic acid diester has a chlorine content of 20 ppm or lower.

DETAILED DESCRIPTION OF THE INVENTION

The copolycarbonate resin according to the present invention preferably comprises the repeating unit represented by formula (I) and the repeating unit represented by formula (II) at a molar ratio of 90/10 to 10/90, particularly 80/20 to 20/80. Where the molar ratio, (I)/(II), is less than 10/90, the heat resistance is reduced. With the molar ratio exceeding 90/10, the copolycarbonate tends to have an increased photoelastic constant, an increased water absorption, and a deteriorated balance between a refractive index and an Abbe's number, which is unfavorable for use as an optical material.

The copolycarbonate of the invention can further comprise a repeating unit represented by formula (V):

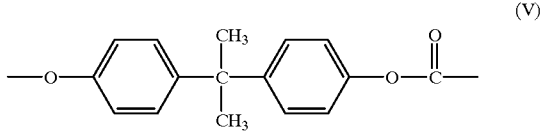

(V)

The content of the repeating unit of formula (V) in the copolycarbonate is less than 90 mol % per mole of the total constituent units.

The unit represented by formula (I) is preferably represented by the following formula:

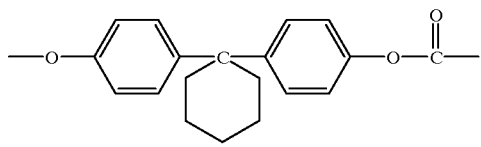

The copolycarbonate resin of the invention has a glass transition temperature of at least 100° C., preferably 110° C. or higher, and more preferably 120° C. or higher.

The polycarbonate resin of the invention preferably has a weight average molecular weight of 30,000 to 200,000, particularly 50,000 to 120,000.

Suitable examples of the aromatic dihydroxy compound represented by formula (III) which can be used in the invention include 1,1-bis(4-hydroxyphenyl)cyclohexane, 4,4'-dihydroxydiphenyl ether, 1,1-bis(4-hydroxyphenyl)-3,5,5-trimethylcyclohexane, 4,4'-dihydroxy-3,3'-dimethylphenyl ether, 4,4'-dihydroxyphenyl sulfide, 4,4'-dihydroxy-3,3'-dimethyldiphenyl sulfide, 4,4'-dihydroxydiphenyl sulfoxide, 4,4'-dihydroxy-3,3'-dimethyldiphenyl sulfoxide, 4,4'-dihydroxydiphenylsulfone, and 4,4'-dihydroxy-3,3'-dimethyldiphenylsulfone. Preferred of them is 1,1-bis(4-hydroxyphenyl) cyclohexane (bisphenol Z, hereinafter abbreviated as BPZ). These aromatic dihydroxy compounds can be used either individually or as a combination of two or more thereof.

The content of an alkali metal or an alkaline earth metal in BPZ is 3 ppm or less, preferably 1 ppm or less, and more preferably 0.5 ppm or less. If the content thereof is larger than 3 ppm, the polycarbonate resin causes coloration, which is not preferable.

A method for removing the alkali metal or alkaline earth metal in BPZ is, for example, a method comprising mixing a solution of BPZ dissolved in an organic solvent, with water, separating an aqueous phase, and cooling an organic phase, thereby recrystallizing BPZ.

BPZ may be used in combination with BPA to provide a copolycarbonate comprising the repeating unit of formula (V). In this case, BPA is used in an amount of less than 90 mol % per mole of the total monomers.

The content of carbonyl groups originated from monoaldehyde or the like which is a reaction intermediate in the synthesis of TCDDM, in tricyclo($5.2.1.0^{2,6}$) decanedimethanol (TCDDM) is preferably 0.5 mg or less, in terms of KOH, per 1 g of TCDDM. If the content thereof is larger than 0.5 mg, coloration of the polycarbonate occurs, which is not preferable.

A purification method for obtaining TCDDM having the carbonyl group content of 0.5 mg or less per 1 g of TCDDM is, for example, a method comprising dissolving TCDDM in an organic solvent such as an alcohol, catalytically hydrogenating in the presence of a catalyst, and the distilling.

The carbonic acid diester which can be used in the invention includes diphenyl carbonate, ditolyl carbonate, bis(chlorophenyl) carbonate, m-cresyl carbonate, dinaphthyl carbonate, dimethyl carbonate, diethyl carbonate, dibutyl carbonate, and dicyclohexyl carbonate, with diphenyl carbonate being preferred.

The chlorine content in the carbonic acid diester which causes coloring should be 20 ppm or less. A preferred chlorine content is 10 ppm or less. The carbonic acid diester is preferably used in an amount of 0.97 to 1.2 mol, preferably 0.99 to 1.10 mol, per mole of the total amount of the aromatic dihydroxy compound (including BPA if used) and the aliphatic dihydroxy compound.

According to the process for producing the copolycarbonate according to the present invention, a basic compound is used as a catalyst for ester interchange. Suitable basic compounds include alkali metal and/or alkaline earth metal compounds and nitrogen-containing compounds. Examples include organic or inorganic acid salts, oxides, hydroxides, hydrides or alkoxides of an alkali metal or alkaline earth metal, quaternary ammonium hydroxides and salts thereof, and amines. They can be used either individually or as a combination thereof.

Specific examples of useful alkali metal compounds are sodium hydroxide, potassium hydroxide, cesium hydroxide, lithium hydroxide, sodium hydrogencarbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium boron phenylate, sodium benzoate, potassium benzoate, cesium benzoate, lithium benzoate, disodium hydrogenphosphate, dipotassium hydrogenphosphate, dilithium hydrogenphosphate, disodium phenylphosphate, a disodium salt, dipotassium salt, dicesium salt or dilithium salt of bisphenol A, and a sodium salt, potassium salt, cesium salt or lithium salt of phenol.

Specific examples of the alkaline earth metal compounds are magnesium hydroxide, calcium hydroxide, strontium hydroxide, barium hydroxide, magnesium hydrogencarbonate, calcium hydrogencarbonate, strontium hydrogencarbonate, barium hydrogencarbonate, magnesium acetate, calcium acetate, strontium acetate, barium acetate, magnesium stearate, calcium stearate, calcium benzoate, and magnesium phenylphosphate.

Specific examples of the nitrogen-containing compounds include quaternary ammonium hydroxides having an alkyl group, an aryl group, an allylaryl group, etc., such as tetramethylammonium hydroxide, tetraethylammonium hydroxide, tetrapropylanmonium hydroxide, tetrabutylammonium hydroxide, and trimethylbenzylammonium hydroxide; tertiary amines, such as triethylamine, dimethylbenzylamine, and triphenylamine; secondary amines, such as diethylamine and dibutylamine; primary amines, such as propylamine and butylamine; imidazoles, such as 2-methylimidazole and 2-phenylimidazole; ammonia; and basic salts, such as tetramethylammonium borohydride, tetrabutylammonium tetraphenylborate, and tetraphenylammonium tetraphenylborate.

The catalyst is used in an amount of $10^{-9}$ to $10^{-3}$ mol, preferably $10^{-7}$ to $10^{-5}$ mol, per mole of the total amount of the aromatic dihydroxy compound (including BPA if used) and the aliphatic dihydroxy compound.

The ester interchange reaction can be carried out in a usual manner known for melt polycondensation. That is, the above-described starting materials are allowed to react in the presence of the catalyst by heating under atmospheric pressure or under reduced pressure while removing by-products. The reaction is usually carried out in two or more stages. More specifically, the first stage reaction is performed at 120 to 260° C., preferably 180 to 240° C. for 0 to 5 hours, preferably 0.5 to 3 hours. The reaction temperature is then elevated while diminishing the inner pressure to allow the aromatic dihydroxy compound, the aliphatic dihydroxy compound and the carbonic acid diester to undergo ester interchange. In the final stage, polycondensation reaction proceeds at a temperature of 200 to 300° C. under reduced pressure of 1 mmHg or lower. The reaction may be either in a continuous system or in a batch system. The reaction unit for carrying out the reaction may be a reaction tank or an extruder type reactor or a horizontal reactor equipped with a stirring blade having excellent surface renewal properties, such as paddles, gate paddles, spectacle blades, and the like.

After completion of the polymerization, it is desirable that the catalyst in the resulting polycarbonate be removed or deactivated to secure stability of the polymer against heat and hydrolysis. Removal or deactivation of the catalyst for ester interchange such as an alkali metal or alkaline earth metal compound is preferably effected by addition of an acidic substance known as a heat stabilizer or a hydrolysis stabilizer. Suitable acidic substances include aromatic sulfonic acids, such as p-toluenesulfonic acid, aromatic sulfonic esters, such as butyl p-toluenesulfonate and hexyl p-toluenesulfonate, organic halides, such as stearyl chloride, butyryl chloride, benzoyl chloride, p-toluenesulfonyl chloride; alkylsulfuric acids, such as dimethyl sulfate; and inorganic acids, such as boric acid and phosphoric acid.

If desired, the catalyst deactivation can be followed by removal of low-boiling compounds from the resulting polymer by gasifying at 200 to 300° C. under a pressure of 0.1 to 1 mmHg. A horizontal reactor equipped with a stirring blade having excellent surface renewal properties, such as a paddle, a gate paddle, a spectacle blade, etc. or a thin film evaporator is effective for this purpose.

If desired, the copolycarbonate of the invention may contain, in addition to the above-described heat stabilizer or hydrolysis stabilizer, various additives, such as antioxidants, pigments, dyes, strengthening agents or fillers, ultraviolet absorbers, slip agents, parting agents, nucleating agents, plasticizers, flow modifiers, antistatics, and so forth. These additives can be mixed into the polycarbonate resin in a conventional manner. For example, they are dispersively mixed into the resin in a high-speed mixer, such as a tumbling mixer, a Henschel mixer, a ribbon blender or a super mixer, and melt-kneaded in an extruder, a Banbury mixer, a roll, etc.

The copolycarbonate according to the present invention enjoys improvements in refractive index, balance of dispersion, photoelastic constant, and the like while retaining the excellent characteristics inherent to polycarbonate resins, such as impact resistance and heat resistance. Therefore, it is suited as a plastic optical material for various lenses, prisms, optical disk substrates, and the like.

The present invention will now be illustrated in greater detail with reference to Examples, but it should be understood that the invention is not deemed to be limited thereto.

The physical properties of the polycarbonate resins prepared were measured as follows.

1) Weight Average Molecular Weight (Mw):
Measured by gel-permeation chromatography on Shodex GPC system 11 and calculated on styrene calibration. Chloroform was used as a developing solvent.

2) Glass Transition Temperature (Tg):
Measured with a differential scanning thermometer.

3) Refractive Index:
Measured with an Abbe's refractometer in accordance with JIS K 7105.

4) Abbe's Number:
Measured with an Abbe's refractometer and calculated.

5) Impact Strength in Falling Ball Impact Test:
A steel ball was dropped from a height of 7 cm on a specimen having a diameter of 50 mm and a thickness of 3.0 mm. The weight of the steel ball with which the specimen broken was recorded.

EXAMPLE 1

In a 300 ml-volume four-necked flask equipped with a stirrer and a distillator were charged 11.4 g (0.05 mol) of bisphenol A, 22.8 g (0.10 mol) of TCDDM, 13.4 g (0.05 mol) of bisphenol Z, 43.3 g (0.202 mol) of diphenyl carbonate and $6.0 \times 10^{-7}$ mol of sodium hydrogencarbonate, and the mixture was heated to 180° C. in a nitrogen atmosphere and stirred for 30 minutes. The degree of vacuum was adjusted to 150 mmHg, and the inner temperature was raised up to 200° C. at a rate of 60° C./hr to conduct ester interchange. The temperature was further elevated to 240° C. while distilling off phenol. After the reaction system was kept at that temperature for 10 minutes, the reaction pressure was diminished to 1 mmHg or lower over a period of 1 hour. The reaction was continued for 6 hours in total while stirring. After completion of the reaction, nitrogen was blown into the reactor until atmospheric pressure was reached, and the produced polycarbonate was taken out. The physical properties of the resulting polycarbonate are shown in Table 1 below.

EXAMPLE 2

The same procedure of Example 1 was repeated, except for using 18.3 g (0.08 mol) of bisphenol A, 18.3 g (0.08 mol) of TCDDM, and 10.7 g (0.04 mol) of bisphenol Z, to obtain bisphenol A-TCDDM-bisphenol Z copolycarbonate, the physical properties of which are shown in Table 1.

COMPARATIVE EXAMPLE 1

The same procedure of Example 1 was repeated, except that TCDDM and bisphenol Z were not used but 45.6 g (0.20 mol) of bisphenol A was used alone. The physical properties of the resulting polycarbonate are shown in Table 1. The Abbe's number of the polycarbonate was small.

COMPARATIVE EXAMPLE 2

The same procedure of Example 1 was repeated, except that bisphenol Z was not used but 22.8 g (0.10 mol) of bisphenol A and 22.8 g (0.10 mol) of TCDDM were used. The physical properties of the resulting polycarbonate are shown in Table 1.

EXAMPLE 3

The same procedure of Example 1 was repeated, except for using 23.62 g (0.088 mol) of bisphenol Z and 21.98 g (0.112 mol) of TCDDM, to obtain bisphenol Z-TCDDM copolycarbonate, the physical properties of which are shown in Table 1.

EXAMPLE 4

The same procedure of Example 1 was repeated, except for using 26.84 g (0.1 mol) of bisphenol Z and 19.63 g (0.1 mol) of TCDDM, to obtain bisphenol Z-TCDDM copolycarbonate. The physical properties of the resulting polymer are shown in Table 1.

TABLE 1

|  | Example 1 | Example 2 | Compara. Example 1 | Compara. Example 2 | Example 3 | Example 4 |
|---|---|---|---|---|---|---|
| Mw | 52000 | 58000 | 51000 | 55000 | 52000 | 52000 |
| Tg (° C.) | 113 | 116 | 149 | 108 | 119 | 125 |
| Refractive Index | 1.531 | 1.533 | 1.584 | 1.558 | 1.561 | 1.565 |
| Abbe's Number | 38 | 36 | 30 | 39 | 40 | 39 |
| Impact Strength (g) | >500 | >500 | >500 | >500 | >500 | >500 |

While the invention has been described in detail and with reference to specific examples thereof, it will be apparent to one skilled in the art that various changes and modifications can be made therein without departing from the spirit and scope thereof.

What is claimed is:

1. A process for producing an aromatic-aliphatic copolycarbonate, said process comprising polycondensing 1,1-bis(4-hydroxyphenyl)cyclohexane, tricyclo(5.2.1.0$^{2,6}$)decanedimethanol and a carbonic acid diester in a molten state under heating, wherein said carbonic acid diester has a chlorine content of 20 ppm or lower.

2. A process according to claim 1, wherein said carbonic acid diester is diphenyl carbonate.

3. A process according to claim 1, wherein said carbonic acid diester has a chlorine content of 10 ppm or lower.

4. A process for producing an aromatic-aliphatic copolycarbonate which comprises polycondensing 1,1-bis(4-hydroxyphenyl)cyclohexane, tricyclo(5.2.1.0$^{2,6}$)decanedimethanol and a carbonic acid diester in a molten state in the following three stages:

a) 1,1-bis(4-hydroxyphenyl)cyclohexane, tricyclo(5.2.1.0$^{2,6}$)decanedimethanol and a carbonic acid diester in a molten state are reacted at 120 to 260° C. for 0.5 to 5 hours;

b) the reaction temperature is then elevated while lowering the inner pressure; and c) polycondensation is carried out at 200 to 300° C. under a reduced pressure of 1 mmHg or lower.

5. A process according to claim 4, wherein step a) is carried out at 180 to 240° C. for 0.5 to 3 hours.

6. A process according to claim 4, wherein the process is catalyzed by an alkali metal or an alkaline earth metal compound catalyst, whereafter the alkali metal or alkaline earth metal compound catalyst is deactivated by adding acid after removal of low-boiling compounds.

* * * * *